United States Patent [19]

Nakanishi

[11] Patent Number: 5,692,145
[45] Date of Patent: Nov. 25, 1997

[54] METHOD AND APPARATUS FOR GENERATING AND PERFORMING OPERATIONS ON TABLE TYPE DATABASES USING ICONS

[75] Inventor: Jun Nakanishi, Kawasaki, Japan

[73] Assignee: Hitachi, Ltd., Tokyo, Japan

[21] Appl. No.: 464,576

[22] Filed: Jun. 5, 1995

[30] Foreign Application Priority Data

Jul. 21, 1994 [JP] Japan ................... 6-169278

[51] Int. Cl.$^6$ ................... G06F 3/14
[52] U.S. Cl. ................... 395/348; 395/351
[58] Field of Search ................... 395/145, 147, 395/148, 149, 155, 156, 157, 158, 159, 160, 161, 600, 326, 348, 349, 351, 352, 353, 333

[56] References Cited

U.S. PATENT DOCUMENTS

| | | | |
|---|---|---|---|
| 5,347,628 | 9/1994 | Brewer et al. | 395/159 |
| 5,428,776 | 6/1995 | Rothfield | 395/600 |
| 5,467,448 | 11/1995 | Hilton et al. | 395/148 |
| 5,546,526 | 8/1996 | Li et al. | 395/159 |
| 5,553,218 | 9/1996 | Li et al. | 395/148 |

*Primary Examiner*—Wayne Amsbury
*Assistant Examiner*—Ruay Lian Ho
*Attorney, Agent, or Firm*—Antonelli, Terry, Stout & Kraus, LLP

[57] ABSTRACT

A method and apparatus for permitting a user to perform operations between data of at least two tables. In the invention table icons each representing one of the at least two tables are displayed on a display and the user is permitted to move one of the table icons to a position on the display where the display of the one table icon overlaps the display of another of the at least two table icons and selects an operation to be executed between data of tables corresponding to the one and the other table icons. The operation selected by the user is automatically executed when the one table icon is moved to a position overlapping the other table icon. A new table including data resulting form the selected operation and a new table icon representing the new table is generated and the new table icon representing the new table is displayed.

24 Claims, 23 Drawing Sheets

FIG. 29

| LANGUAGE RECORD TABLE FILE | | | | | |
|---|---|---|---|---|---|
| CLASS | SEAT NO. | NAME | TEST DATE | POINT | ~6a |
| B | 01 | | 940301 | 60 | |
| B | 02 | | 940301 | 70 | |
| B | 03 | | 940301 | 50 | |
| B | 04 | | 940301 | 100 | |
| B | 05 | | 940301 | 80 | |
| B | 06 | | 940301 | 90 | |

FIG. 30

| ARITHMETIC RECORD TABLE FILE | | | | | | |
|---|---|---|---|---|---|---|
| CLASS | SEAT NO. | NAME | TEST DATE | POINT | NOTE | ~6b |
| B | 01 | | 940301 | 70 | | |
| B | 02 | | 940301 | 90 | | |
| B | 03 | | 940301 | 60 | | |
| B | 04 | | 940301 | 100 | O | |
| B | 05 | | 940301 | 90 | | |

FIG. 31

SCIENCE RECORD TABLE FILE ~6C

| CLASS | SEAT NO. | NAME | TEST DATE | POINT |
|---|---|---|---|---|
| B | 01 | | 940301 | 100 |
| B | 02 | | 940301 | 60 |
| B | 03 | | 940301 | 80 |
| B | 04 | | 940301 | 80 |
| B | | | | 0 |
| B | 05 | | 940301 | 70 |

FIG. 32

2 - SUBJECT TOTAL FILE ~6d

| CLASS | SEAT NO. | NAME | TEST DATE | POINT | NOTE |
|---|---|---|---|---|---|
| B | 01 | | 940301 | 100 | |
| B | 02 | | 940301 | 160 | |
| B | 03 | | 940301 | 110 | |
| B | 04 | | 940301 | 200 | O |
| B | 05 | | 940301 | 170 | |
| B | 06 | | 940301 | 90 | |

| CLASS | SEAT NO. | NAME | TEST DATE | POINT | NOTE |
|---|---|---|---|---|---|
| B | 01 |  | 940301 | 230 |  |
| B | 02 |  | 940301 | 220 |  |
| B | 03 |  | 940301 | 190 |  |
| B | 04 |  | 940301 | 280 | O |
| B | 05 |  | 940301 | 170 |  |
| B | 06 |  | 940301 | 160 |  |

3 - SUBJECT TOTAL FILE ~6e

WHOLE COUNTRY

FIG. 37

| PRODUCT NUMBER | PRODUCT NAME | NUMBER OF PRODUCTS SOLD | UNIT COST |
|---|---|---|---|
| 0001 | RACOON | 100 | 5,000 |
| 0002 | ELEPHANT | 50 | 10,000 |
| 0003 | SEA TURTLE | 150 | 3,000 |
| 0004 | FRILLED LIZARD | 200 | 4,000 |
| 0005 | ORANGUTAN | 100 | 4,000 |

OSAKA

| PRODUCT NUMBER | PRODUCT NAME | NUMBER OF PRODUCTS SOLD | UNIT COST |
|---|---|---|---|
| 0001 | RACOON | 50 | 5,000 |
| 0002 | ELEPHANT | 50 | 10,000 |
| 0003 | SEA TURTLE | 200 | 3,000 |
| 0004 | FRILLED LIZARD | 100 | 4,000 |
| 0005 | ORANGUTAN | 50 | 4,000 |

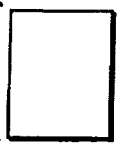
KYOTO

| PRODUCT NUMBER | PRODUCT NAME | NUMBER OF PRODUCTS SOLD | UNIT COST |
|---|---|---|---|
| 0001 | RACOON | 150 | 5,000 |
| 0002 | ELEPHANT | 100 | 10,000 |
| 0003 | SEA TURTLE | 100 | 3,000 |
| 0004 | FRILLED LIZARD | 50 | 4,000 |
| 0005 | ORANGUTAN | 100 | 4,000 |

HYOGO

FIG. 39

PLAIN TEXT (MANAGEMENT TABLE OF PRODUCT SALE)

| COLUMN A (PRODUCT NUMBER) | COLUMN B (PRODUCT NAME) | COLUMN C (NUMBER SOLD) | COLUMN D (UNIT COST) | COLUMN E (NOTE) |
|---|---|---|---|---|
| 0001 | RACOON | 100 | 5,000 | |
| 0002 | ELEPHANT | 50 | 10,000 | |
| 0003 | SEA TURTLE | 150 | 3,000 | |
| 0004 | FRILLED LIZARD | 200 | 4,000 | |
| 0005 | ORANGUTAN | 100 | 4,000 | |

CIPHER KEY (RANDOM NUMBERS, ETC.)

| COLUMN A | COLUMN B | COLUMN C | COLUMN D | COLUMN E |
|---|---|---|---|---|
| 0101 | ABCDEFG | 1010 | 10,101 | ABCDEF |
| 0011 | HIJKLMN | 1101 | 01,010 | GHIJKL |
| 1010 | OPQRSTU | 0100 | 10,101 | MNOPQR |
| 1111 | VWXYZAB | 1111 | 01,010 | STUVWX |
| 0000 | CDEFGHI | 0100 | 10,101 | YZABCD |

CIPHER TEXT (COLUMN D ENCIPHERED)

| COLUMN A (PRODUCT NUMBER) | COLUMN B (PRODUCT NAME) | COLUMN C (NUMBER SOLD) | COLUMN D (UNIT COST) | COLUMN E (NOTE) |
|---|---|---|---|---|
| 0001 | RACOON | 100 | 15,101 | |
| 0002 | ELEPHANT | 50 | 11,010 | |
| 0003 | SEA TURTLE | 150 | 13,101 | |
| 0004 | FRILLED LIZARD | 200 | 5,010 | |
| 0005 | ORANGUTAN | 100 | 14,101 | |

METHOD AND APPARATUS FOR GENERATING AND PERFORMING OPERATIONS ON TABLE TYPE DATABASES USING ICONS

BACKGROUND OF THE INVENTION

The present invention relates to a method and apparatus for performing operations on data of a table type database. More particularly, the present invention relates to a method and apparatus for performing operations including changing/generating between data of at least two table type databases by manipulating icons being displayed on the display screen of a personal computer or workstation.

When data within a table is to be operated on in a conventional table calculation software product, it has been necessary to open a window by selecting a table icon or file, as disclosed in "1.5 Calculation between Other Tables", Table Calculation Software OFIS/POL-EX2 (3000-7-032-10), March, 1994 (Second Edition), pp. 341–345. Particularly, when an operation is to be performed between all cell data in the same positions of a plurality of tables, it has been necessary for an operator to assign a cell range to be operated on by using a keyboard and the display of the respective tables after the windows including the tables have been opened. Further, the arithmetic operation for respective data of a plurality of tables is limited to the four fundamental rules of arithmetic and other operations are not supported.

As mentioned above, when a table calculation is to be performed using the conventional technique, an operator must operate on the respective table data on a display by using a keyboard after a window corresponding to a file or table icon is opened. Therefore, when there are large numbers of items of table data, there is a problem that the number of operations to be performed by the operator becomes considerably large and operating procedures also become complicated.

Further, in a case where a plurality of tables are arithmetically operated on each other, there is a problem that operations other than the four fundamental rules of arithmetic can not be performed.

SUMMARY OF THE INVENTION

An object of the present invention is to provide a method and apparatus for performing operations on data of a table type database.

Another object of the present invention is to provide a method and apparatus for performing operations on a table type database other than the four fundamental rules of arithmetic.

Yet another object of the present invention is to provide a method and apparatus for performing operations between data of at least two table type databases by manipulating icons being displayed on the display screen of a personal computer or workstation without opening the icons.

In order to achieve the above objects, the method and apparatus of the present invention generates a new table icon by automatically performing operations selected by an operator between cells in the same positions of at least two table type database structures corresponding to at least two icons by overlapping one of the table icons over the other of the table icons on a display screen by using a mouse.

Further, by opening a totalizing icon and displaying it as a totalizing window and closing the totalizing window after table icons to be totalized are moved into the totalizing window, a totalizing processing for data of the same cells of all of the table type database structures corresponding to the icons in the totalizing window is automatically performed and a result is generated as a new table icon.

Still further, by generating icons for all of table items and selecting, from a pop up menu of the table items, attributes of a desired processing, such as extraction, exclusion, arithmetic operation object, etc. by a mouse, it is possible to extract only desired items from the table, to delete designated items and to determine items of the tables to be operated on including the kind of operation to be performed. A result of the processing is generated as a new table icon.

According to the present invention, it is possible to perform operations on cells in the same positions of a plurality of table type databases by use of a mouse without the need for opening icons, to simplify the processing procedure and to provide a capability of easily generated database. Further, by providing various arithmetic operations in a pop up menu, table calculations other than the four fundamental rules of arithmetic become possible.

BRIEF DESCRIPTION OF DRAWINGS

The present invention will be more apparent from the following detailed description, when taken in conjunction with the accompanying drawings, in which:

FIG. 29 is a schematic diagram illustrating an example of a layout construction of a language record table file in the present embodiment;

FIG. 30 is a schematic diagram illustrating an example of a layout construction of a mathematic record table file in the present embodiment;

FIG. 31 is a schematic diagram illustrating an example of a layout construction of a science record table file in the present embodiment;

FIG. 32 is a schematic diagram illustrating an example of a layout construction of a 2 subject total file in the present embodiment;

FIG. 37 is a schematic diagram illustrating the number of products sold and the unit cost of respective products in the respective subsets of Pt;

FIG. 39 is a schematic diagram illustrating an example of the plain text, an example of a cipher key and an example of a cipher text produced by adding the cipher key to the plain text.

DETAILED DESCRIPTION OF THE PREFERRED EMBODIMENTS

An embodiment of the present invention will be described in detail with reference to the drawings.

Figure 1:
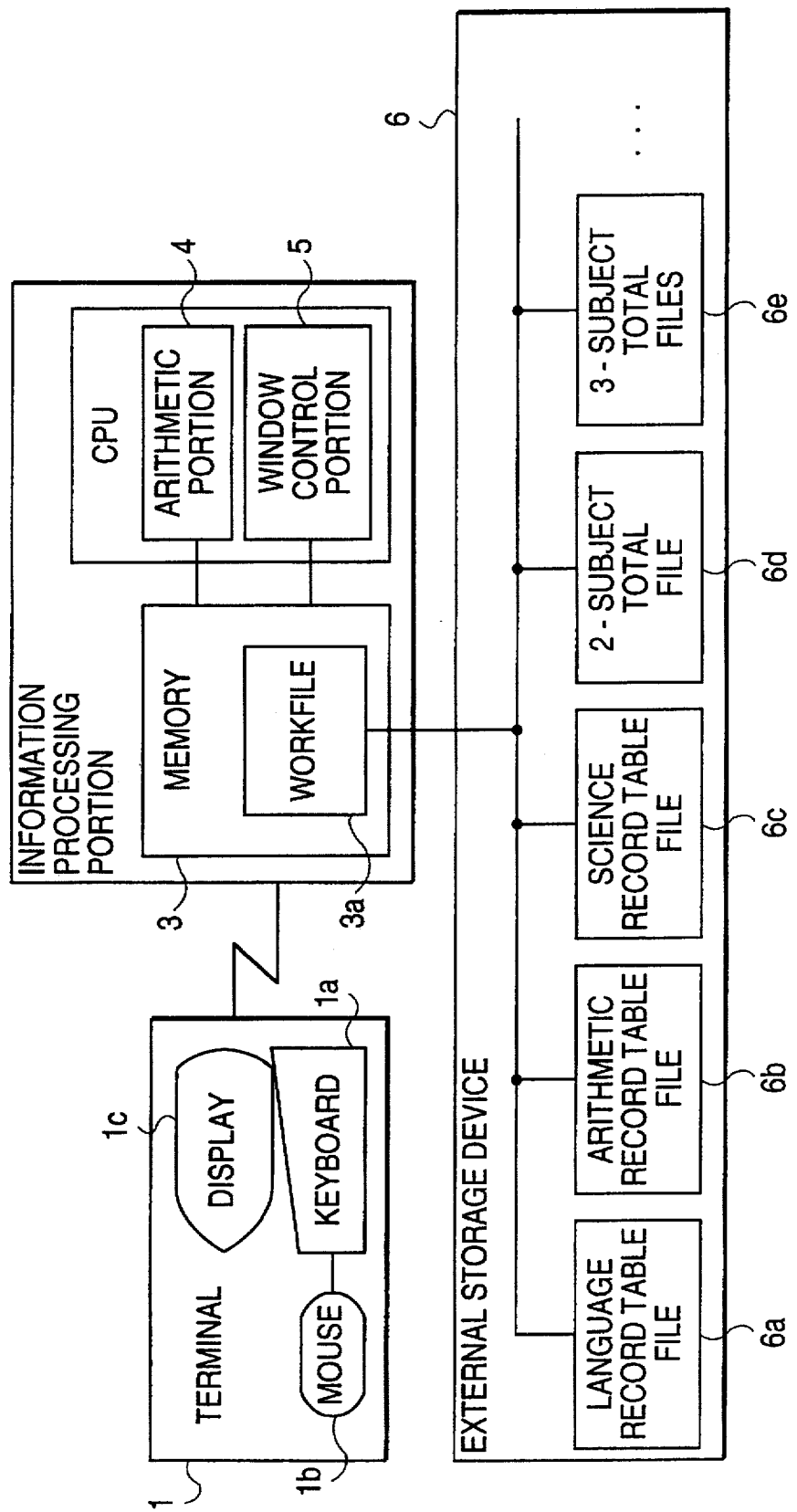
FIG. 1 is a schematic diagram illustrating a table type database changing/generating apparatus of the present invention.

FIG. 1 is a schematic block diagram of an embodiment of a terminal for generating a table type database of the present invention. In FIG. 1, a reference numeral 1 depicts a terminal such as a personal computer or a work station for operating a table calculation and includes a key board 1a, a mouse 1b, a display 1c, an information processing portion 2 and an external storage device 6, etc.

The information processing portion 2 as shown in FIG. 1 includes a central processing unit (CPU) including an arithmetic processing portion 4 and a window control portion 5, etc., and a memory 3 including a working file 3a. The CPU performs a table calculation on the basis of a window operating instruction and an arithmetic processing instruction supplied by the keyboard 1a and the mouse 1b. The external storage device 6 includes a hard disk device, etc., and stores various table files such as, in this embodiment, a language record table file 6a, an arithmetic record table file 6b, a science record table file 6c, which are test record tables of individuals, a 2-subject total file 6d and a 3-subject total file 6e, etc. When a large database is to be handled, it may be possible to implement the present invention in a large scale computer such as a center connected to the terminal as the information processing portion to perform a processing in cooperation with it.

The operation of generating the table type database of this embodiment changes the table file in the external storage device 6 or generates a new table file by controlling the information processing portion 2 by the keyboard 1a and/or the mouse 1b.

FIGS. 2 to 12 show a first embodiment of an icon operation on the display 1c according to the method and apparatus of generating the table type database of the present invention.

Examples of the language record table file 6a, the arithmetic record table file 6b and the science record table file 6c, which are stored in the external storage device 6 shown in FIG. 1, are shown in FIGS. 29, 30 and 31, respectively. The operation for producing the 2-subject total file 6d (FIG. 32) of the individual pupils from the language record table file 6a and the arithmetic record table file 6b will be described with reference to FIGS. 2 to 12 and flowcharts shown in FIGS. 25 to 27.

Figure 2:
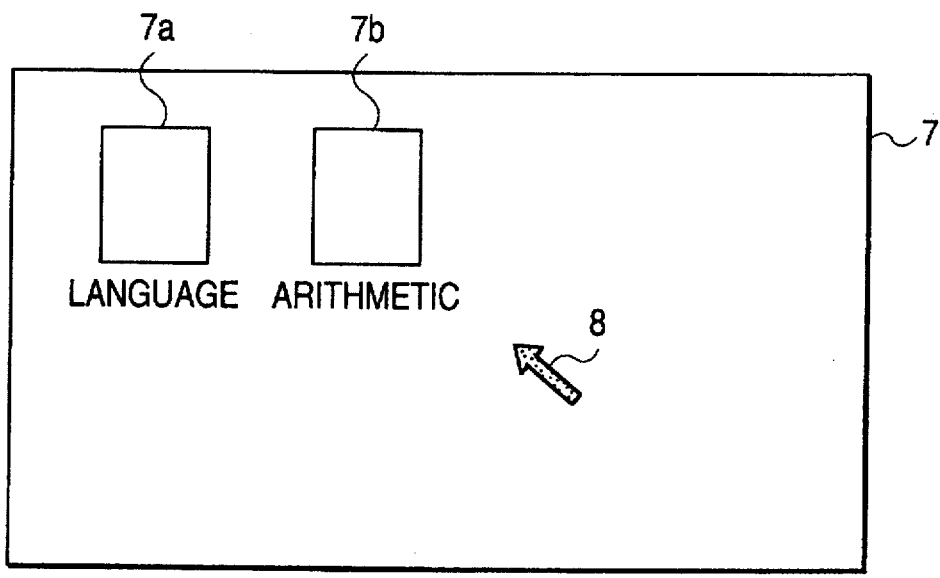
FIG. 2 is a schematic diagram illustrating a table storing window including a table icon "language" and a table icon "arithmetic" in a first embodiment of the present invention.

In FIG. 2, a reference numeral 7 depicts a table storing window having icons. A mouse cursor 8 can be moved on the display 1c by the mouse 1b.

An icon "language" 7a and an icon "arithmetic" 7b on the table storing window 7 are objects to be processed and the respective icons are obtained by iconizing (generating icons representing) the table files shown in FIGS. 29 and 30, respectively. These icons will be referred to as table icons, hereinafter.

Figure 25:
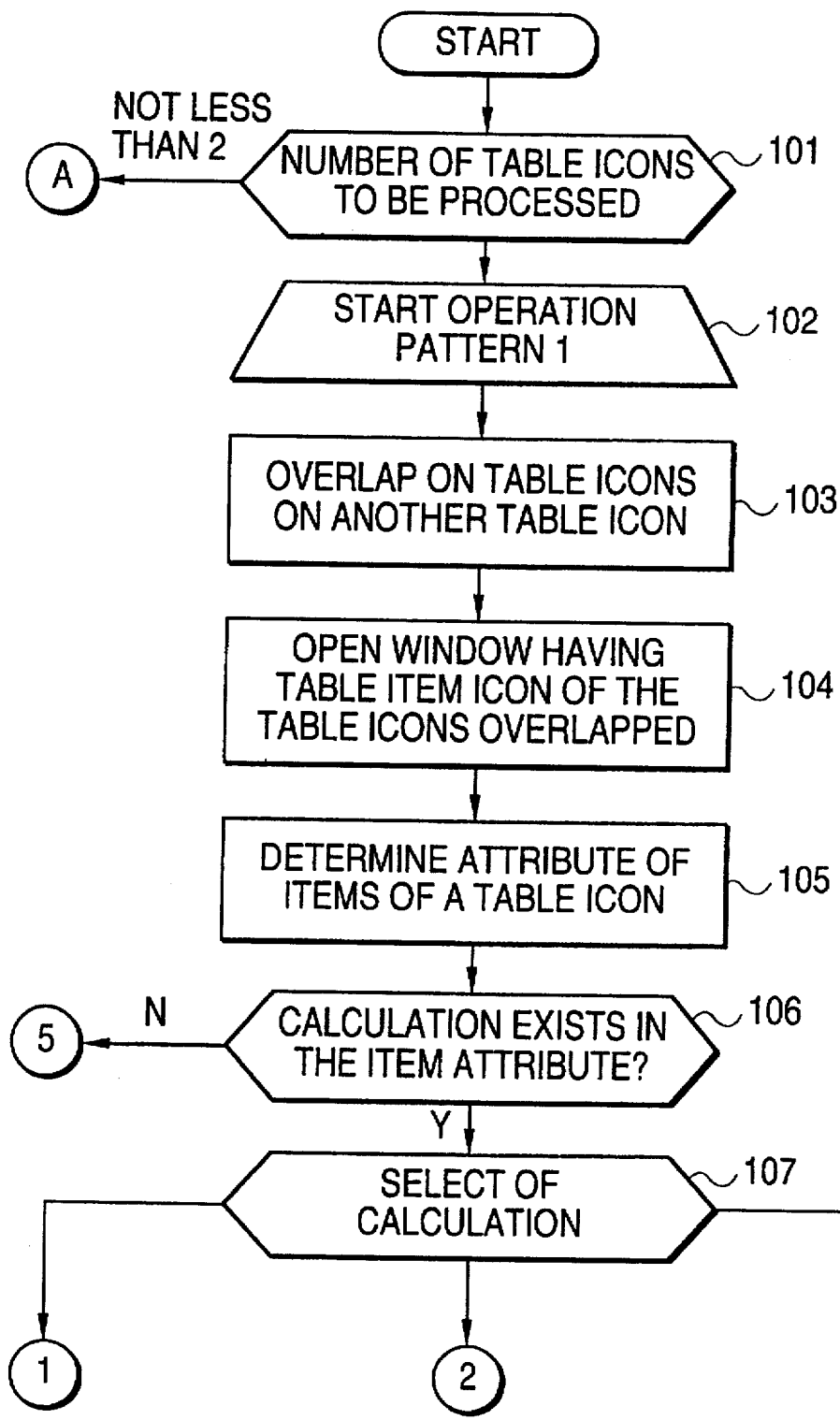
FIG. 25 is a schematic diagram illustrating a flowchart showing an example of processing of the table type database changing/generating method in a first embodiment.
Figure 26:
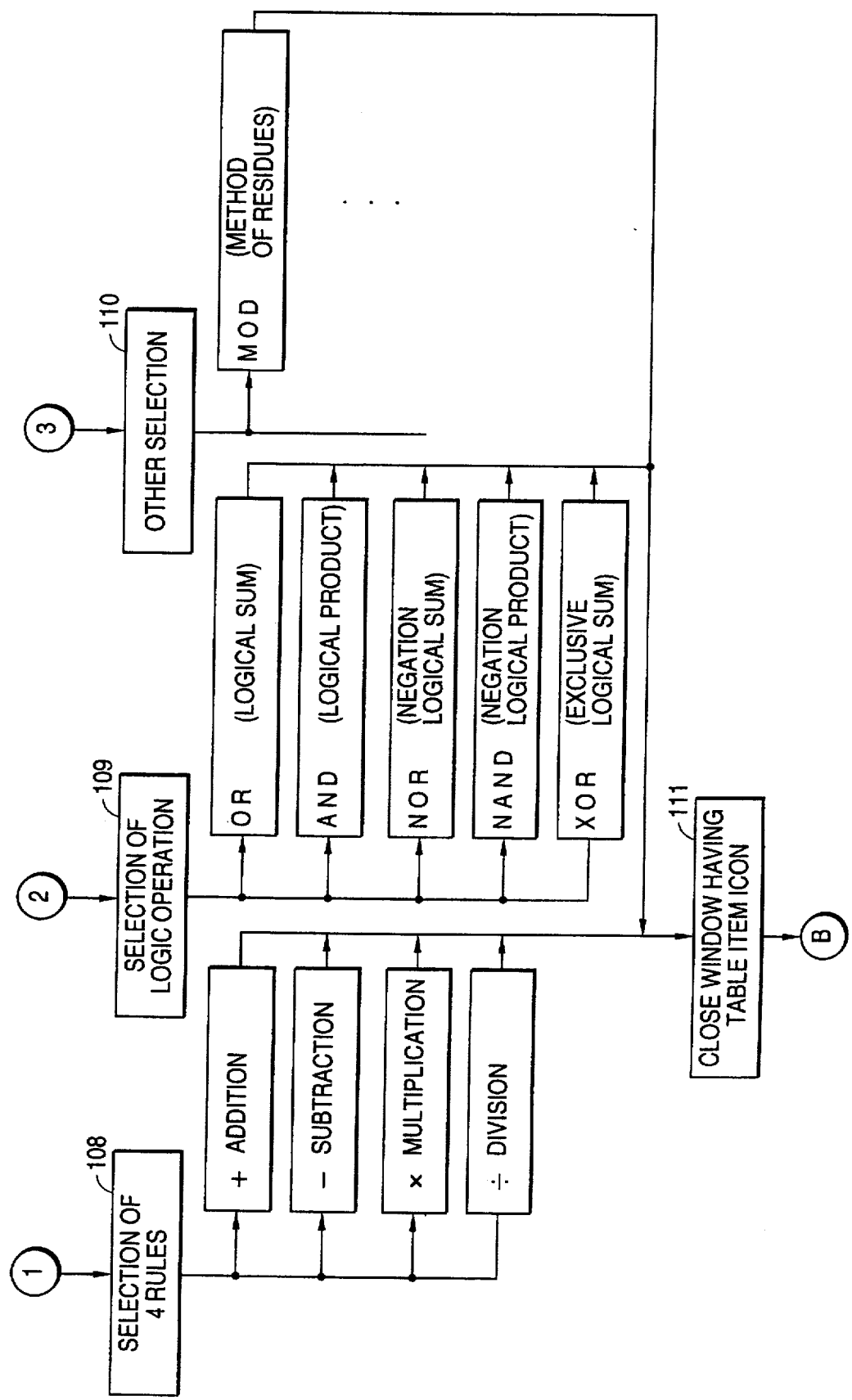
FIG. 26 is a schematic diagram illustrating an additional portion of the flowchart showing the example of processing of the table type database changing/generating method in the first embodiment.
Figure 27:
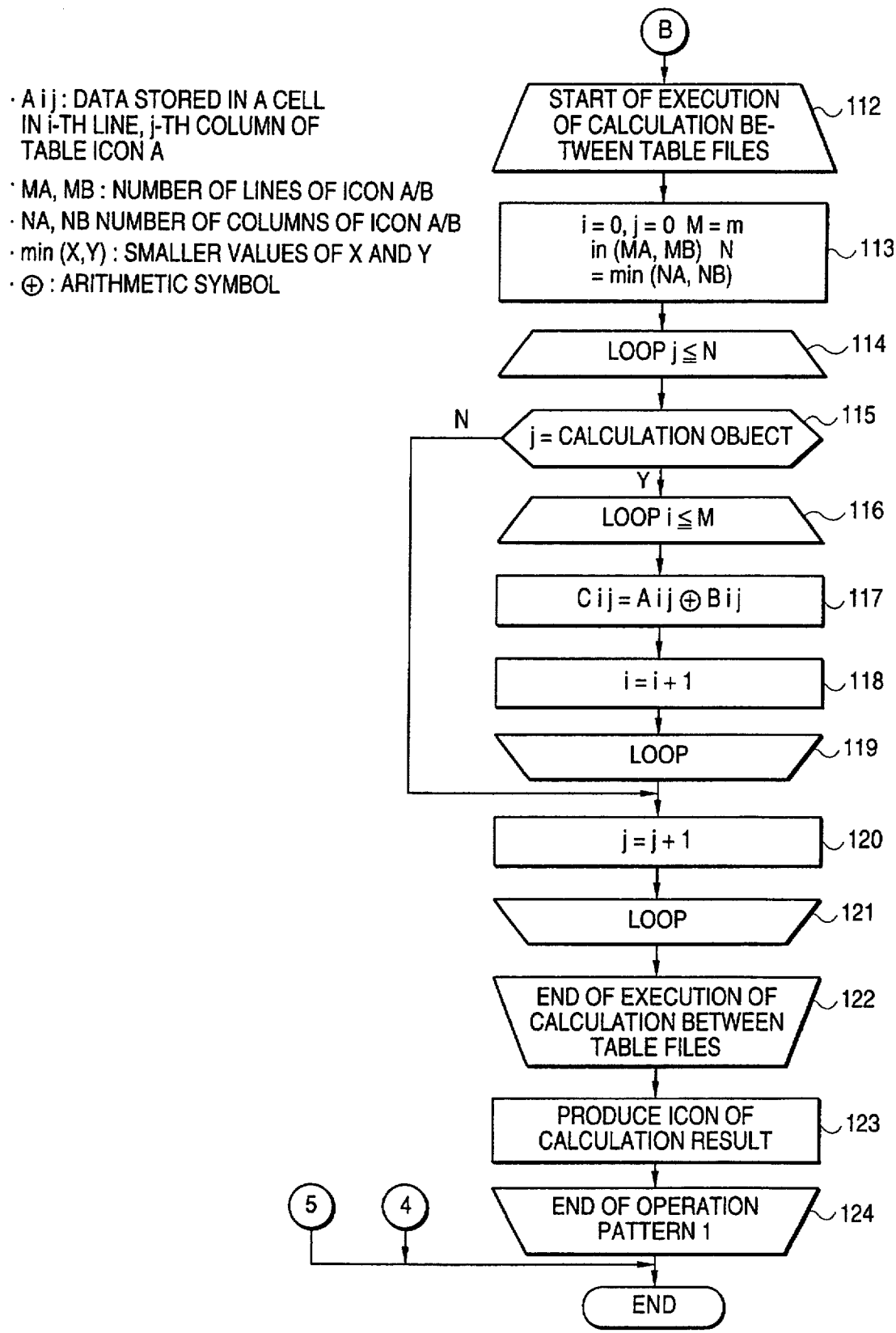
FIG. 27 is a schematic diagram illustrating a further additional portion of the flowchart showing the example of processing of the table type database changing/generating method in the first embodiment.

A name of one table icon is "language" and a name of the other table icon is "arithmetic". It is determined whether the number of table icons to be processed is 2 or 3 (step 101 in FIG. 25). Since, in this example, there are 2 table icons to be processed, the processing of the first embodiment is performed in steps 102–124 (FIGS. 25 to 27).

Figure 3:
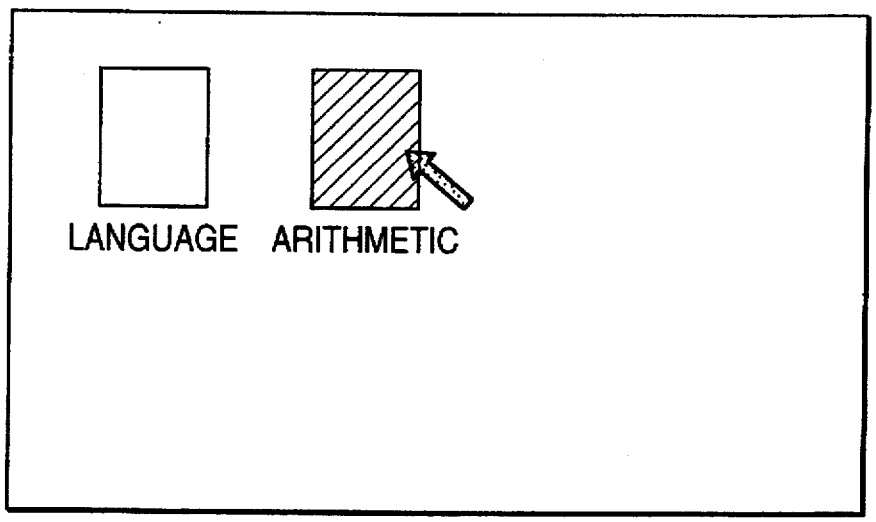
FIG. 3 is a schematic diagram corresponding to FIG. 2 when a mouse cursor is clicked for the table icon "arithmetic"

In the operation of the first embodiment (2-subject total), the mouse cursor 8 is first moved onto the table icon "arithmetic" 7b by using the mouse 1b and a button of the mouse 1b is clicked once so that the designated table icon can be identified by changing a display color, meshing or inverting thereof (FIG. 3).

Figure 4:
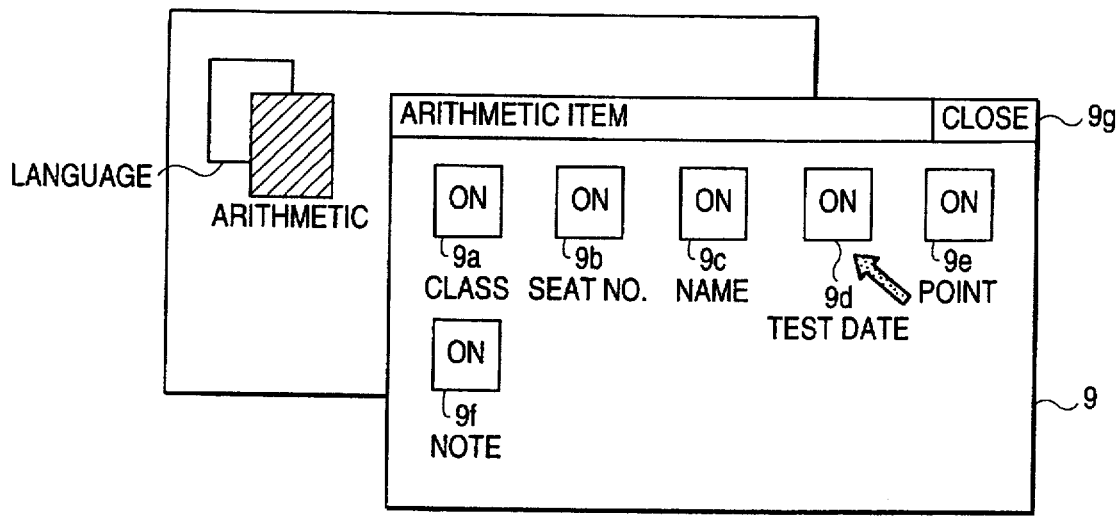
FIG. 4 is a schematic diagram illustrating a table item window is opened on the table storing window when the table icon "arithmetic" is overlapped on the table icon "language"

The table icon "arithmetic" 7b is overlapped on the table icon "language" 7a by moving the table icon "arithmetic" 7b while the button of the mouse 1b held in the selected condition (step 103). When the 2 table icons "language" and "arithmetic" are overlapped, a new table item window "arithmetic" 9 is opened on the table storing window 7. The table subject window "arithmetic" 9 includes table items of the table icon "arithmetic" 7b corresponding to the respective items (class, seat number, name, test date, point, note) of the arithmetic record table file 6b shown in FIG. 30 as icons 9a to 9f (which are referred to as table item icons, hereinafter) (FIG. 4, step 104).

Figure 5:
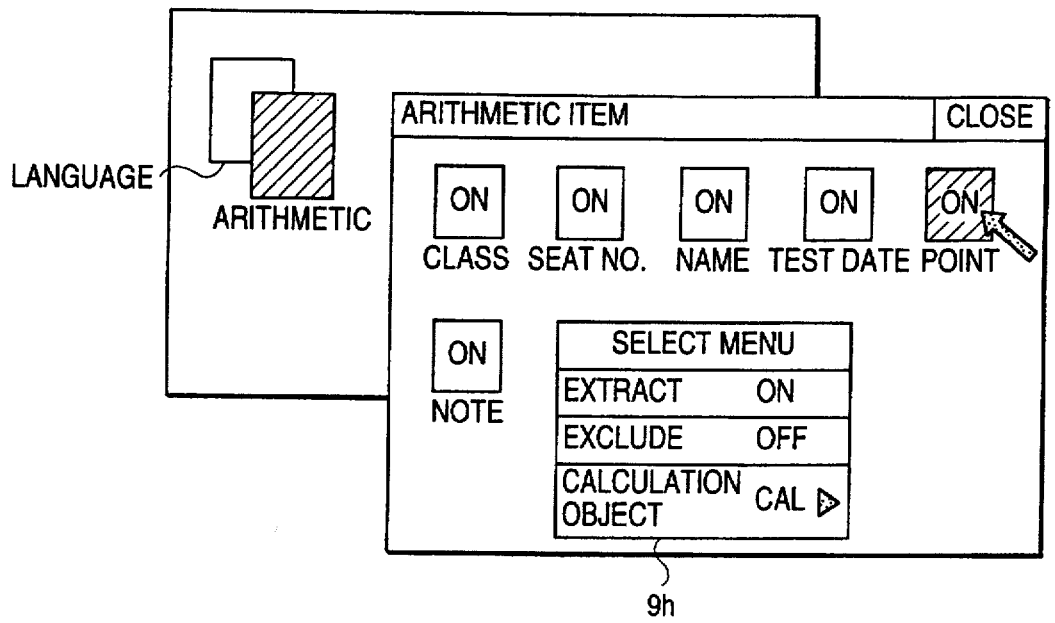
FIG. 5 is a schematic diagram illustrating a table item attribute select menu displayed when a table item icon "point" is picked by a mouse in FIG. 4.
Figure 6:
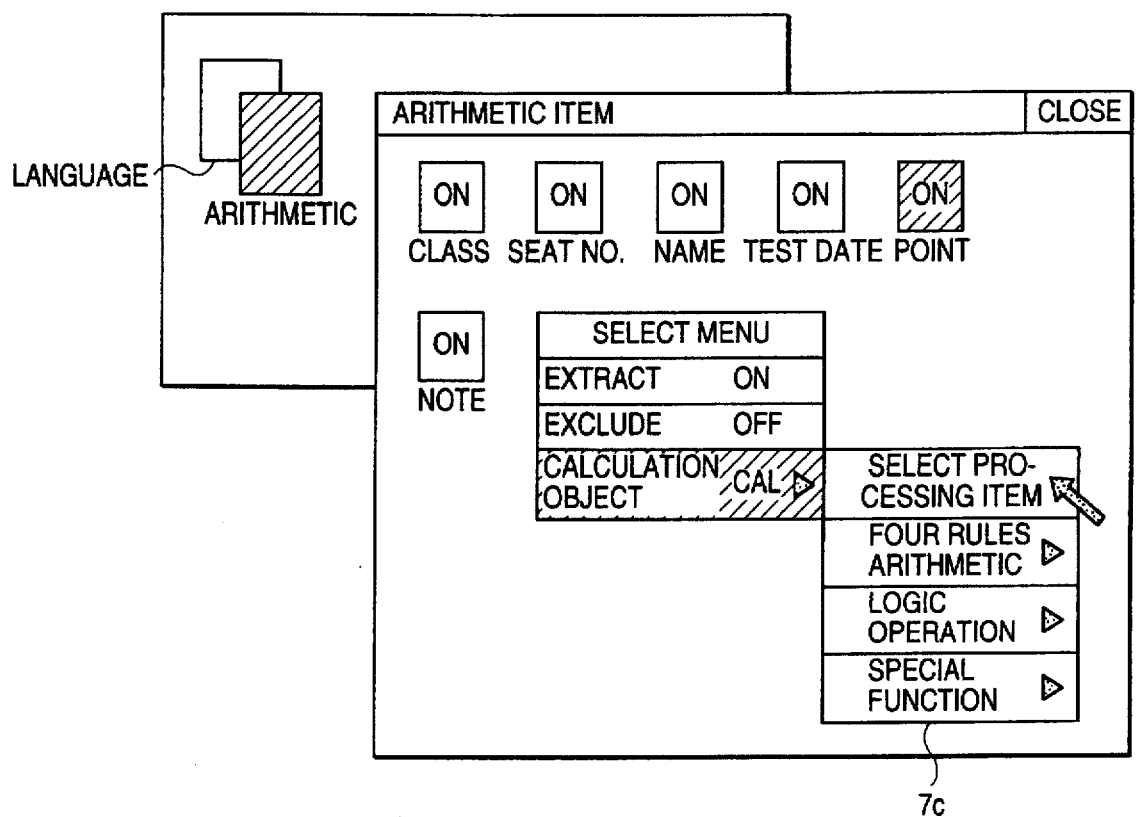
FIG. 6 is a schematic diagram illustrating a calculation select menu (level 1) displayed by selecting "calculation object" by the mouse in FIG. 5.

By selecting a table item icon "point" 9e corresponding to items and points to be added by the mouse 1b, a table item attribute select menu 9h is automatically produced. In this case, the mouse 1b is kept in the selection state. As shown in FIG. 5, the item attribute select menu 9h includes 3 attributes (extract, exclude, calculation object). "Extract" is to select a designated item, "exclude" is to delete a designated item and "calculation object" is to perform a designated arithmetic operation such as four fundamental rules of arithmetic for a designated item, as will be described later. In this embodiment, when the mouse cursor 8 is moved to a position of "calculation object" in order to select the "calculation object" (step 105), a calculation select menu (level 1) 7c is automatically produced on the table storing window 7. As shown in FIG. 6, the calculation select menu (level 1) 7c includes 3 processing items (four rules of arithmetic, logic operation, special operation). In this embodiment, when the mouse cursor 8 is moved to a position of "four rules of arithmetic" to select the "four rules of arithmetic" (step 107), a calculation select menu (level 2) 7d is further automatically produced on the calculation select menu (level 1) 7c.

Figure 7:
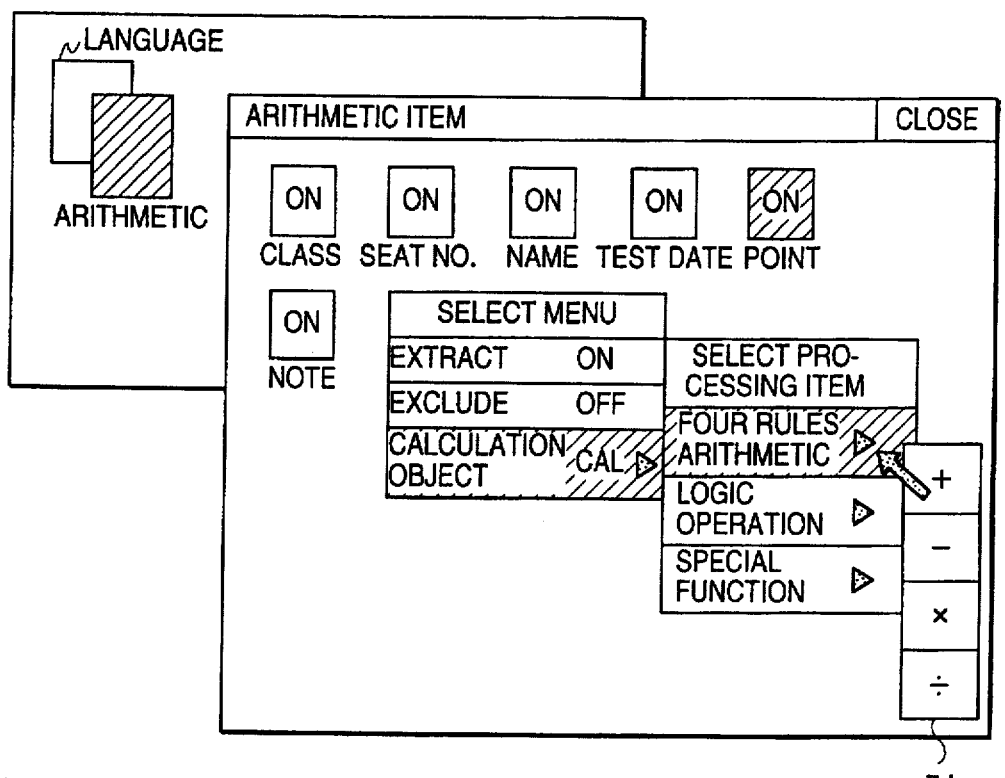
FIG. 7 is a schematic diagram illustrating a calculation select menu (level 2) displayed by selecting "four rules of arithmetic" by the mouse in FIG. 6.
Figure 8:
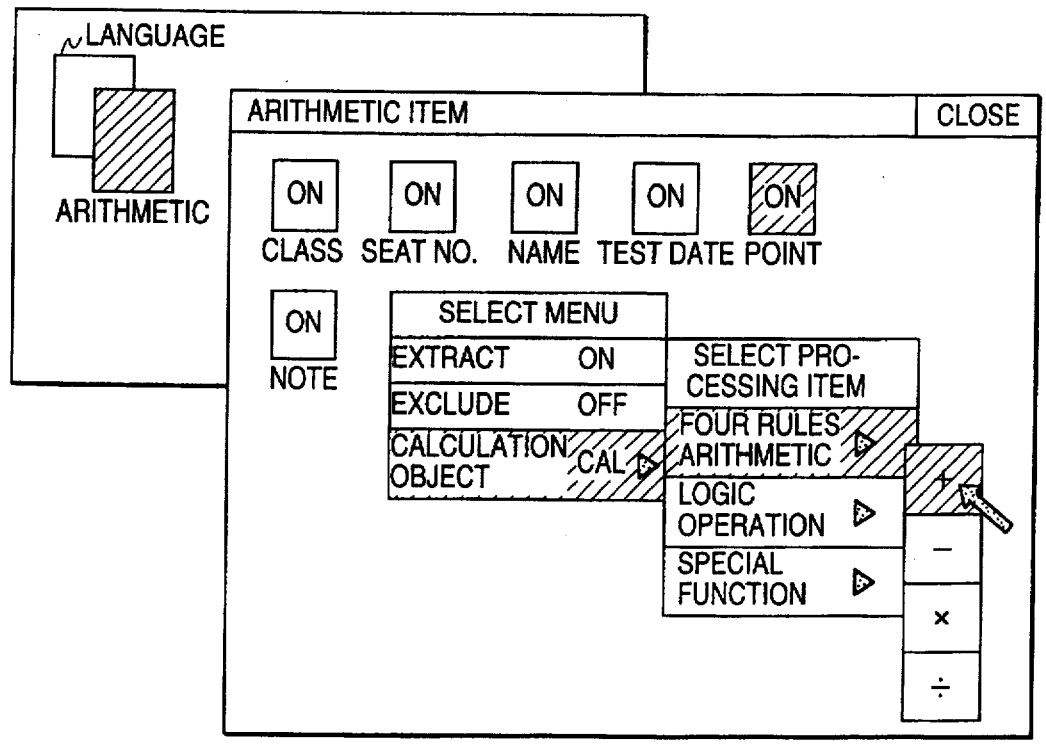
FIG. 8 is a schematic diagram illustrating FIG. 7 when "+" is selected by the mouse.
Figure 9:
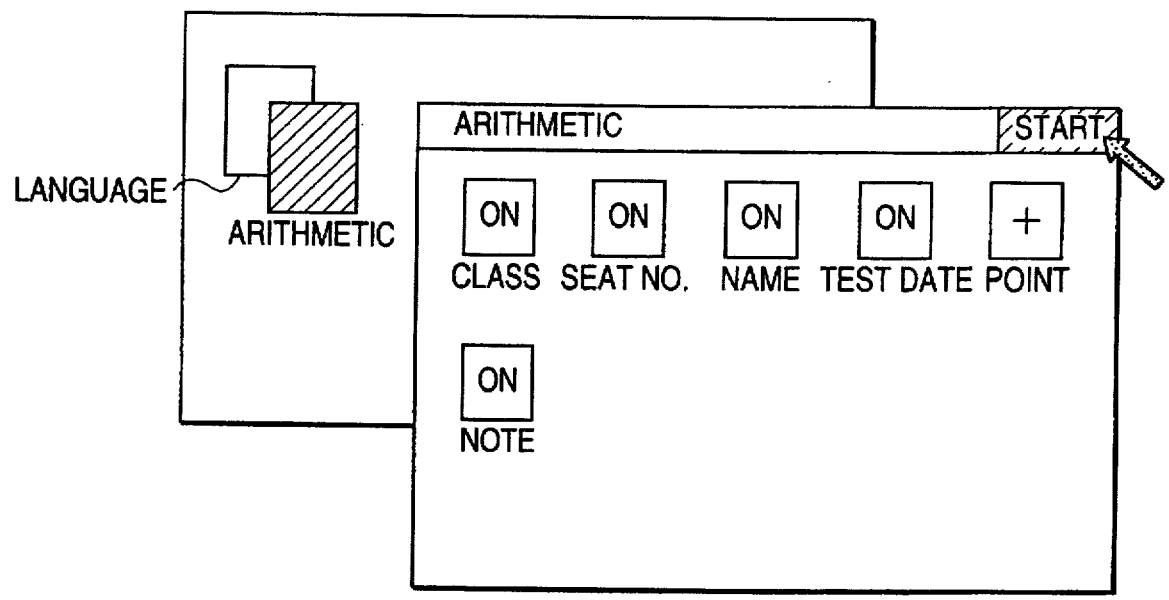
FIG. 9 is a schematic diagram illustrating that, as result of the processing shown in FIG. 8, the attribute display of the table item "point" is changed from ON to + and then the window close switch is clicked.

As shown in FIG. 7, the calculation select menu (level 2) 7d includes 4 items (+, −, ×, −). In this embodiment, it is assumed that an "addition processing" is selected. In order to select the "addition processing", the mouse cursor 8 is moved to a position of "+ (addition)" (FIG. 8) and the clicking of the mouse 1b is stopped (step 108). The table item attribute select menu 9h, the calculation select menu (level 1) 7c and the calculation select menu (level 2) 7d are cleared from the display and an attribute indication of the table item icon "point" 9e is changed from "ON" to "+" (FIG. 9).

When the logic operation is selected in the step 107, one of various logic operations, for example, logical sum (OR), is selected (step 109). Alternatively, when another calculation is selected in the step 107, one of the other operations, for example, method of residues (MOD), is selected (step 110).

Figure 10:
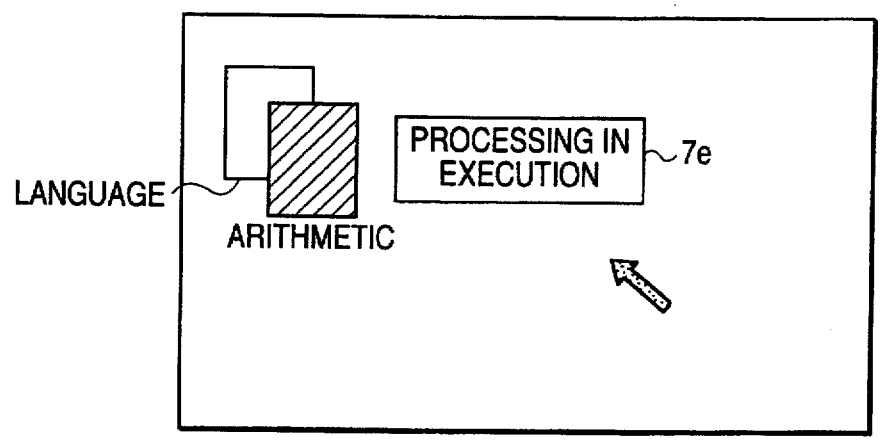
FIG. 10 is a schematic diagram illustrating a state where the table item window "arithmetic" is closed by the clicking the window close switch and additions of point columns of language and arithmetic are executing.
Figure 11:
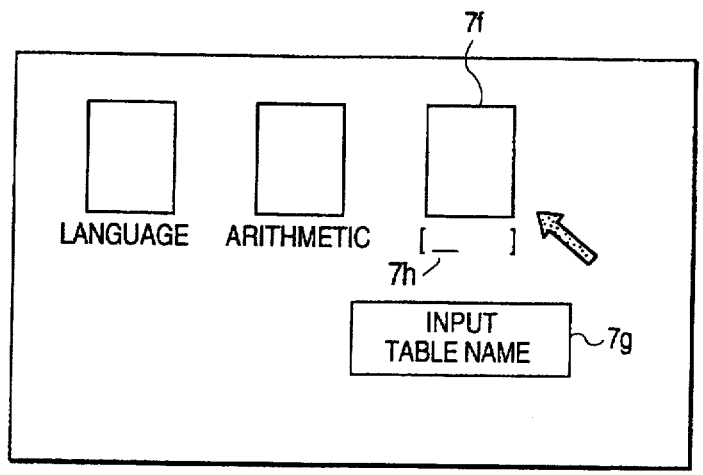
FIG. 11 is a schematic diagram illustrating a state where a table icon "2 subject total" is produced and an input of the table name is being prompted.

When the table item window "arithmetic" 9 is closed by clicking a window close switch 9g once by the mouse 1b (step 111), a processing for adding data of cells in the same positions in a "point" line of the table files of the language and arithmetic is executed (steps 112–122 in FIG. 27). When this processing is started, a message 7e indicating that the processing is in execution is displayed on the table storing window (FIG. 10).

The steps 112 to 122 (FIG. 27) shows the processing steps of deriving cell data in the same positions of the two tables sequentially and operating on them.

First, an initial setting of operation range is performed by setting smaller ones of the numbers of lines (MA and MB) and the numbers of columns (NA and NB) of two tables A and B as M and N, respectively, (step 113).

Steps 114 to 121 are related to a loop processing to be performed for the j-th column under condition that the column number is not larger than N set in the step 113.

The step 115 is to determine whether or not cell data in the j-th column is data to be operated on. If not, the processing is shifted to the step 120 and, if yes, it is shifted to a loop processing defined by the steps 116 to 119.

The loop processing steps 116 to 119 are related to a processing to be performed for the i-th line under condition that the line number is not larger than M set in the step 113. An operation assigned to data of the cell assigned by the i and j is executed (the step 117).

Figure 12:
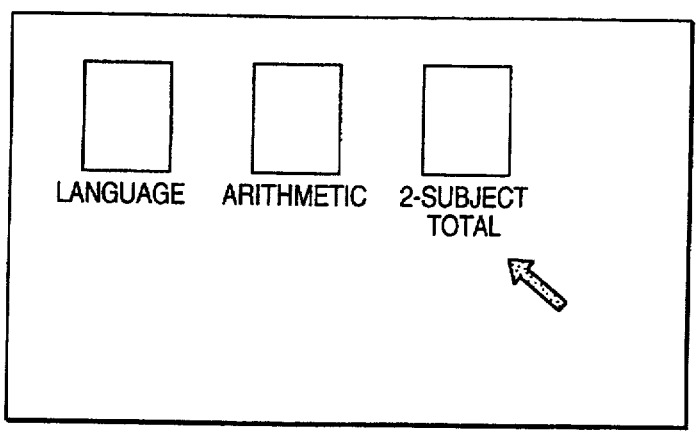
FIG. 12 is a schematic diagram illustrating a display screen when the table name "2 subject total" is input.

The steps 118 and 120 are to update the i-th line and j-th column, respectively. After the addition processing completes internally, a new table icon "2-subject total" 7f is generated as a result of the addition processing (FIG. 11) (step 123). This table icon "2-subject total" 7f corresponds to the 2 subject total file 6d in FIG. 32. The icon name of this table icon "2-subject total" can be input from the key board 1a. In this embodiment, the shown "2-subject total" is provisionally input (FIG. 12). Thus, the operation in the first embodiment (2-subject total processing) is completed (the step 124). When there is no operation for the item attributes (the step 106), the processing is completed.

A second embodiment (3 or more subject total processing) of the icon operation on the display 1c, according to the table type database changing or generating method and apparatus of the present invention will be described.

Figure 28:
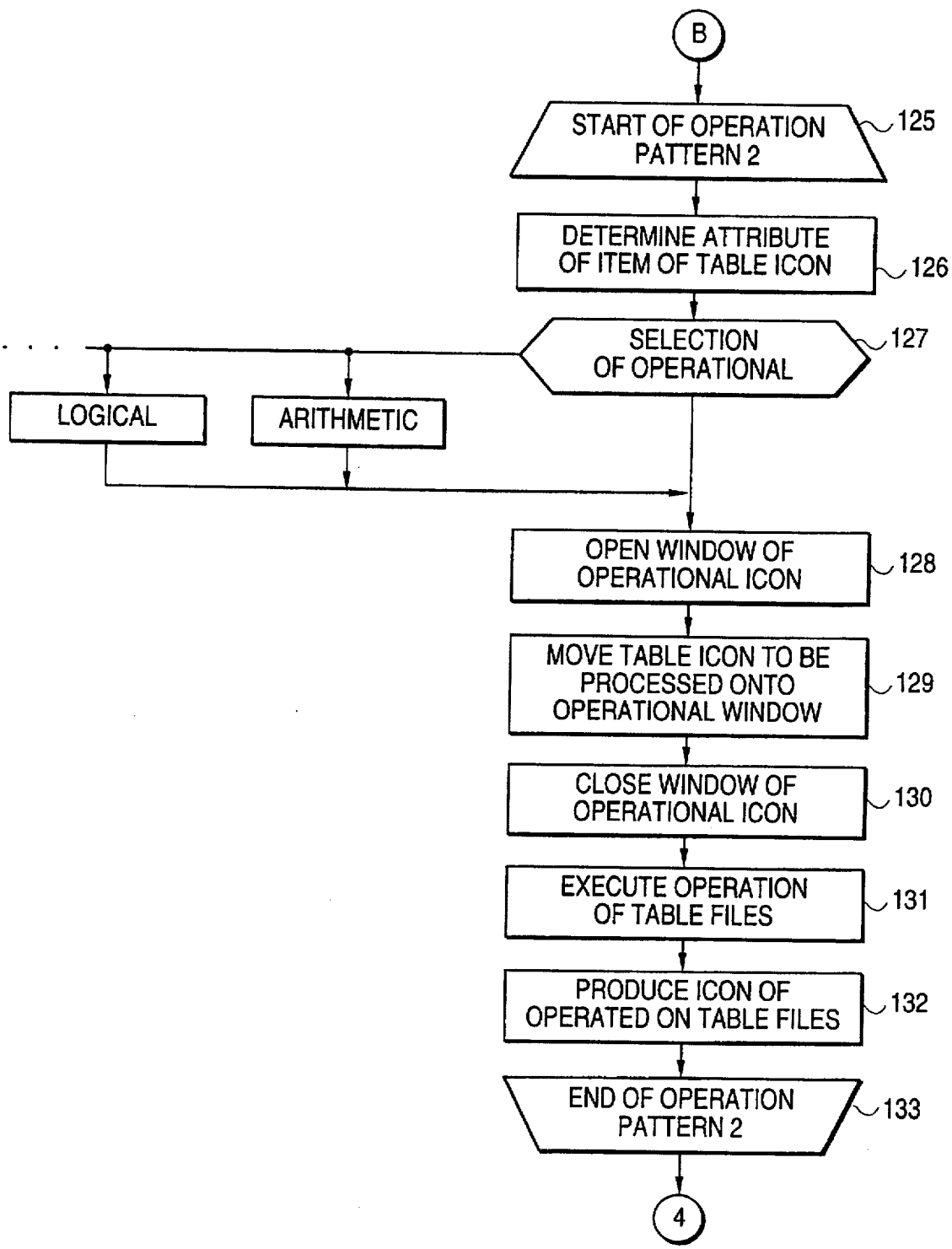
FIG. 28 is a schematic diagram illustrating a flowchart showing an example of processing of the table type database changing/generating method in a second embodiment.

The language record table file 6a, the arithmetic record table file 6b and the science record table file 6c shown in FIGS. 29 to 31 are test record tables of individual pupils. The second embodiment for producing the 3-subject total file 6e of the individual pupils from the three record tables will be described with reference to FIGS. 13 to 24 and a flowchart shown in FIG. 28.

Figure 13:
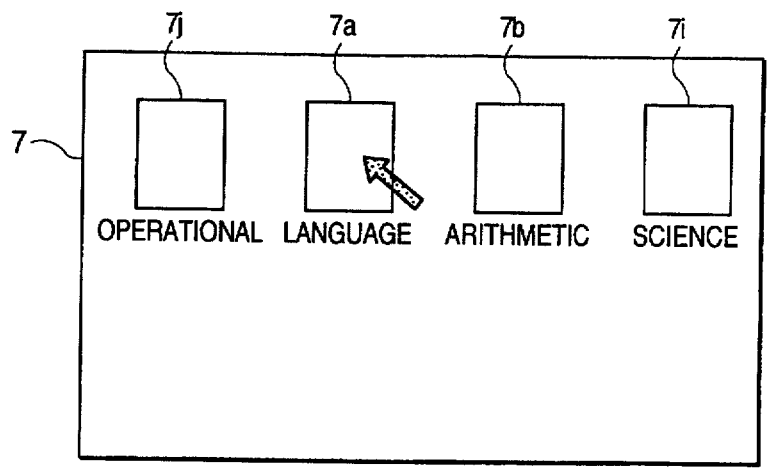
FIG. 13 is a schematic diagram illustrating a table storing window displaying a totalizing icon, table icons "language", "arithmetic" and "science" in a second embodiment.

In the second embodiment, an operational icon 7j, a table icon "language" 7a, a table icon "arithmetic" 7b and a table icon "science" 7i are displayed in the table storing window 7 as shown in FIG. 13.

Figure 14:
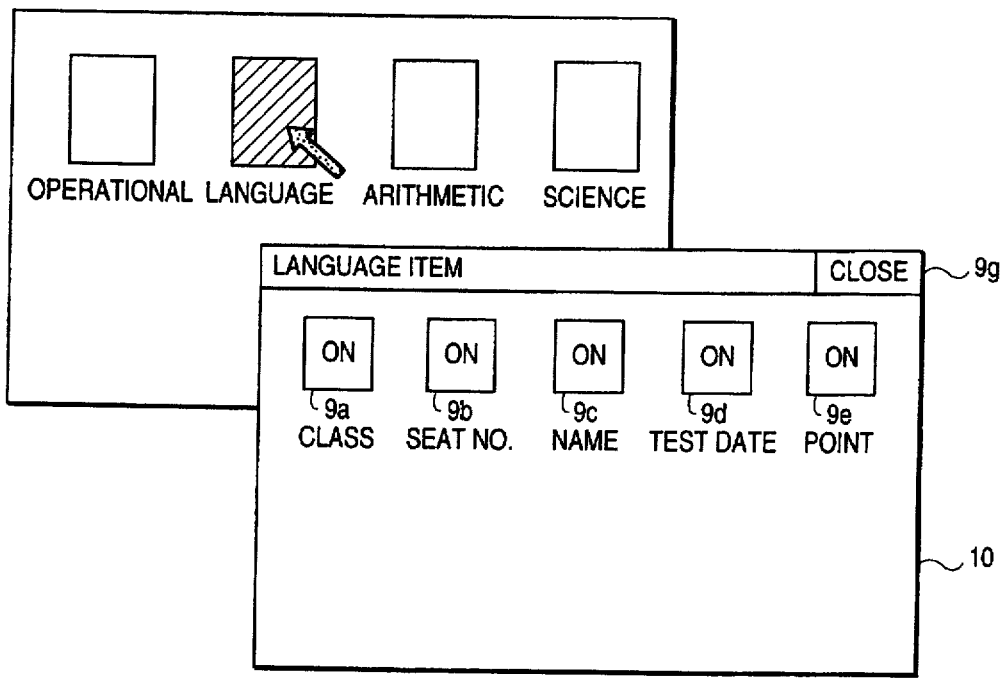
FIG. 14 is a schematic diagram illustrating FIG. 13 where the table item "language" is displayed by clicking the table icon "language"

First, the table icon "language" 7a is clicked by the mouse 1b to open the table item window "language" 10. The table item window "language" 10b has table item icons (class, seat number, name, test date, point) corresponding to the respective items of the language record table file 6a shown in FIG. 29. (FIG. 14).

Figure 15:
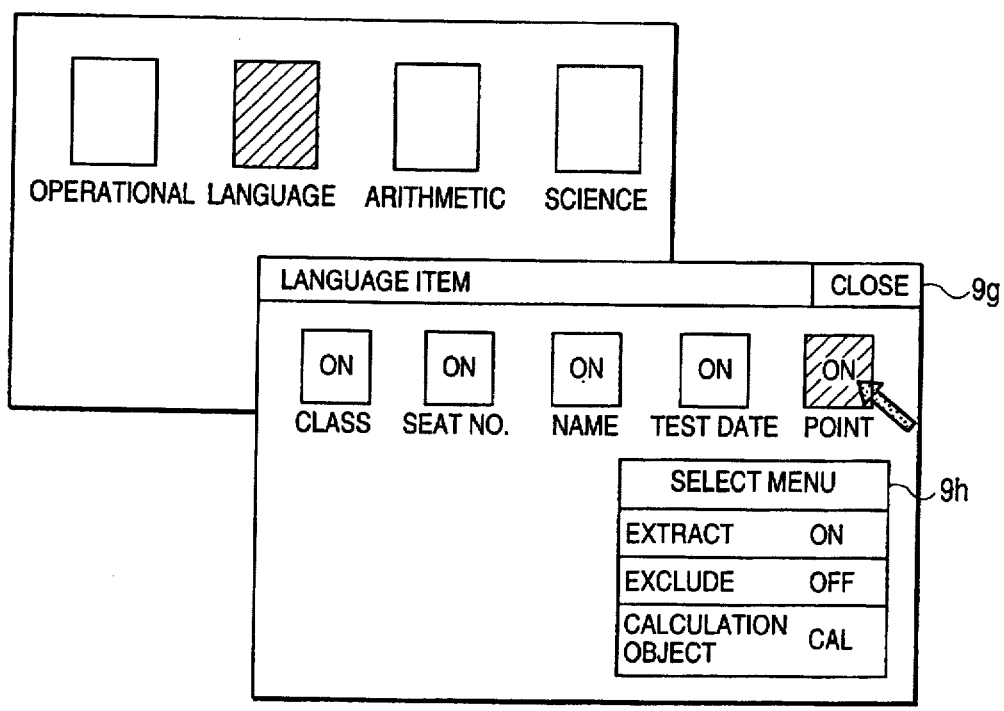
FIG. 15 is a schematic diagram illustrating FIG. 14 where the table item attribute select menu is displayed by clicking the table icon "point"
Figure 16:
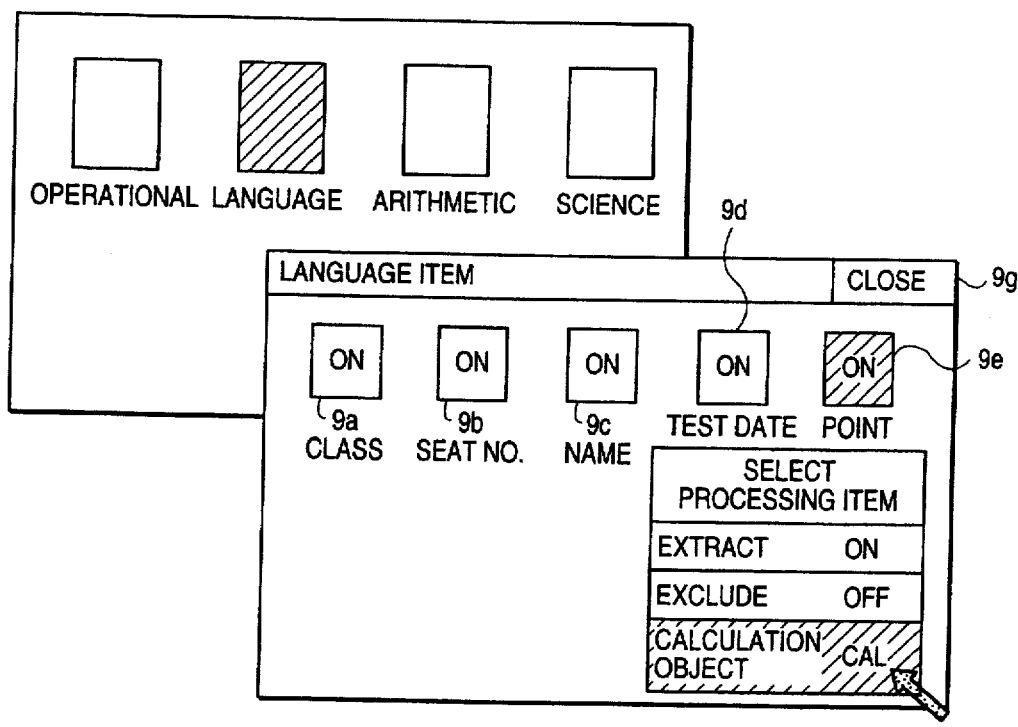
FIG. 16 is a schematic diagram illustrating a FIG. 15 where "calculation object" is selected among the table item attribute select menu.
Figure 17:
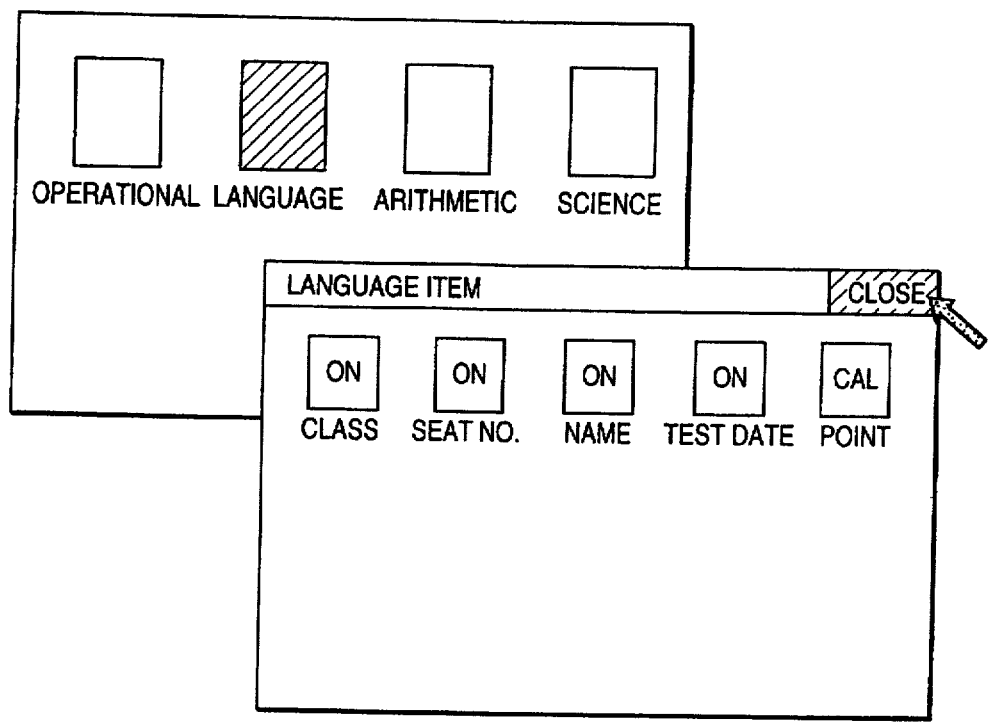
FIG. 17 is a schematic diagram illustrating that, as a result of the processing shown in FIG. 16, the attribute of the table item "point" is changed from ON to CAL and then the window close switch is clicked.

By selecting the item to be operated on and the table item icon "point" 9e by the mouse 1b, a table item attribute select menu 9h is automatically produced. In this case, the mouse 1b is kept in the selection state. As shown in FIG. 15, the item attribute select menu 9h includes 3 attributes (extract, exclude, calculation object). In this embodiment, when, in order to select "calculation object", the mouse cursor 8 is moved to the position of "calculation object" and the selection state of the mouse 1b is stopped, the attribute of the table item icon "point" 9e is changed from "extract" which is defaulted as the initial value to the "calculation object". By clicking the window close switch 9g once by the mouse 1b, the table item window "language" 10 is closed. (FIGS. 16, 17).

Similarly, the attributes of the table item icons "point" of the table icons "arithmetic" and "science" are processed as "calculation object" (step 126). Then, by clicking the operational icon 7j by the mouse 1b, a operational select menu 7k is produced.

Figure 18:
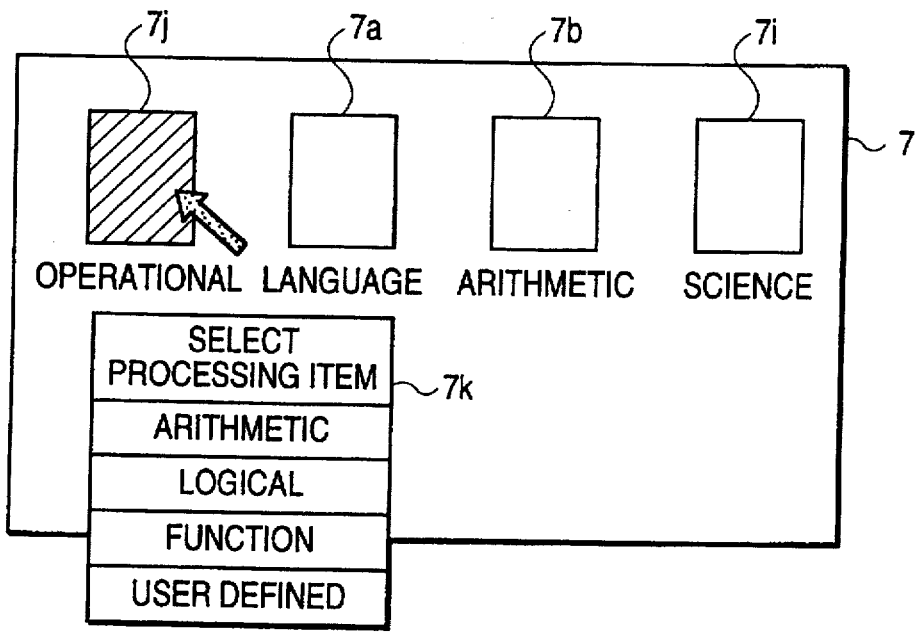
FIG. 18 is a schematic diagram illustrating a totalizing select menu displayed by clicking the totalizing icon.
Figure 19:
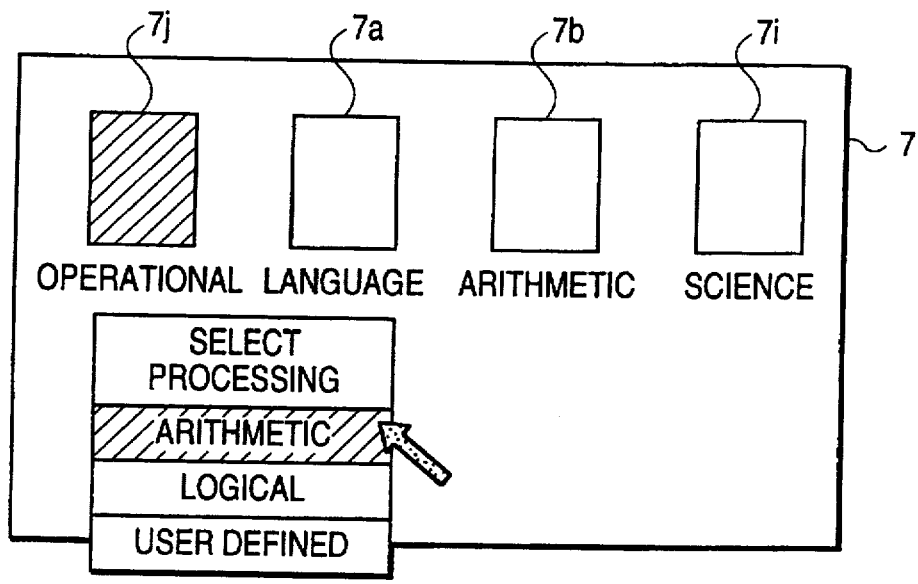
FIG. 19 is a schematic diagram illustrating that an addition (+) is selected among the totalizing select menu.
Figure 20:
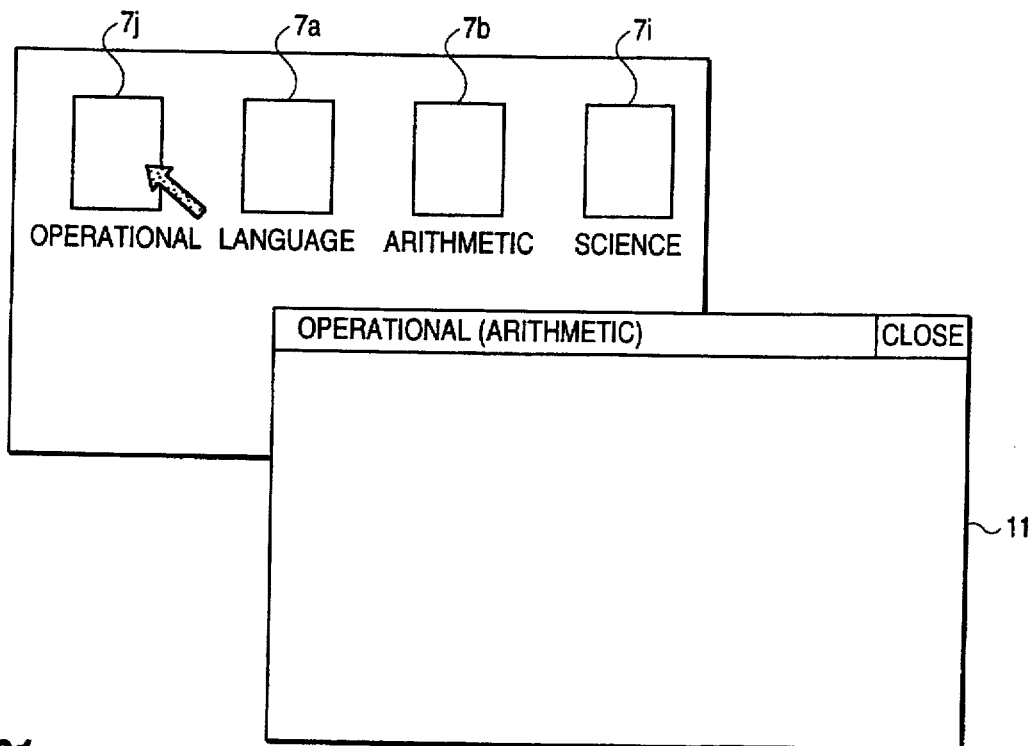
FIG. 20 is a schematic diagram illustrating a that the totalizing window displayed as a result of the selection shown in FIG. 19.
Figure 21:
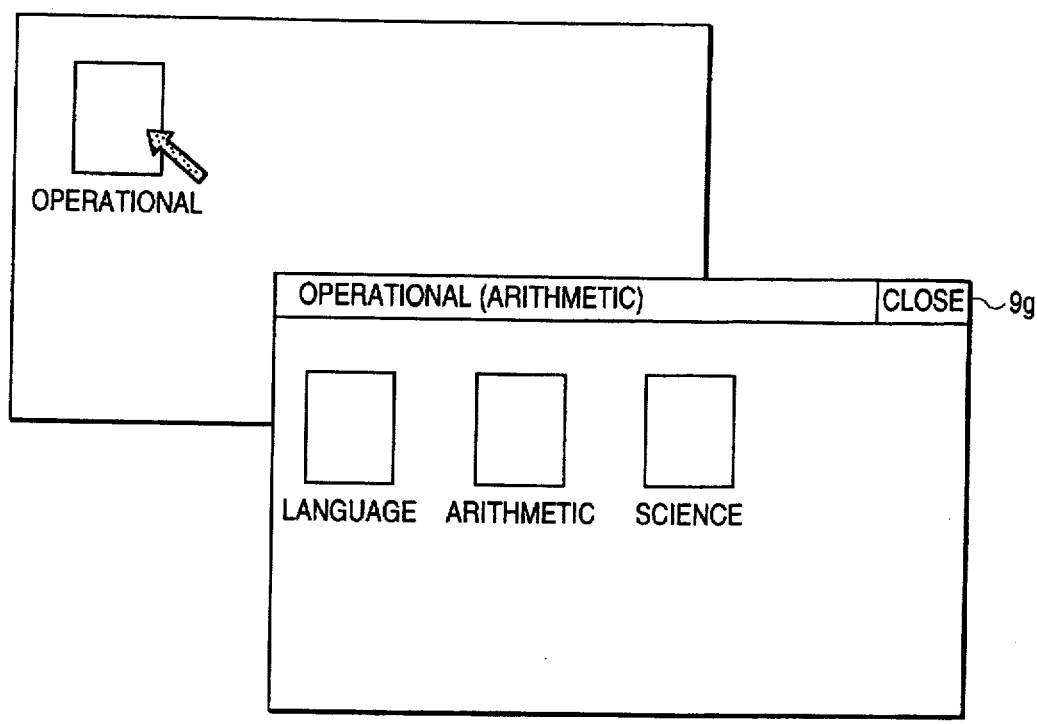
FIG. 21 is a schematic diagram illustrating that, in FIG. 20, the table icons "language", "arithmetic" and "science" are moved from the table storing window to the totalizing window by the mouse.
Figure 22:
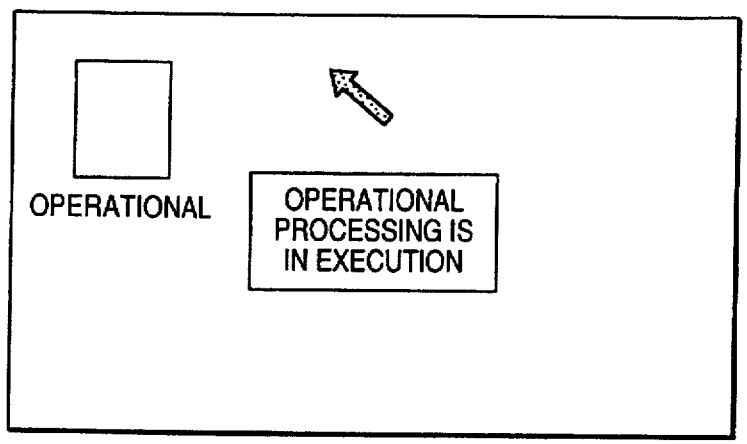
FIG. 22 is a schematic diagram illustrating a state where, by the clicking of the window close switch, the totalizing window is closed and points of the "language", "arithmetic" and "science" are being totalized.

As shown in FIG. 18, the operational select menu 7k has several select items such as arithmetic, logical, function or user defined processings. The arithmetic processings can be addition, subtraction, multiplication or division. The function processing can be an equation and user defined processing can be any type of processing defined by the user. In this embodiment, in order to select the "arithmetic processing", the mouse cursor 8 is moved to a position of "arithmetic" (FIG. 19) (step 127) and the clicking of the mouse 1b is stopped, a operational window 11 is automatically produced (step 128).

The table icon "language" 7a on the table storing window 7 is selected by the mouse 1b and is moved onto the operational window 11 (step 129). Similarly, the table icon "arithmetic" 7b on the table storing window 7 is selected by the mouse 1b and is moved onto the operational window 11. And, further, the table icon "science" 7f on the table storing window 7 is selected by the mouse 1b and is moved onto the operational window 11 (FIG. 21) (step 129).

Figures 33, 34:
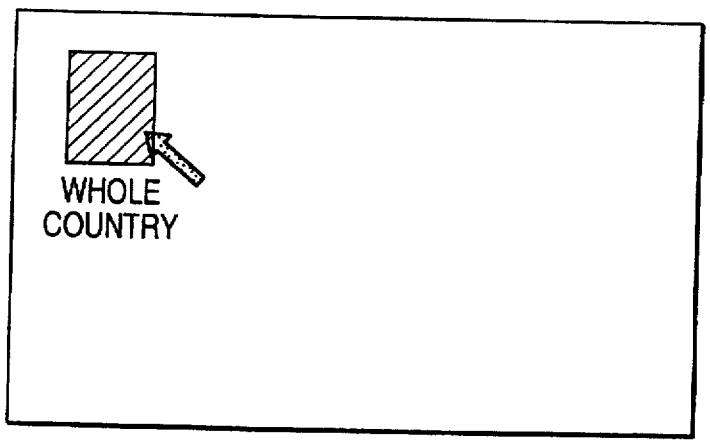
FIG. 33 is a schematic diagram illustrating an example of a layout construction of a 3 subject total file in the present embodiment.
FIG. 34 is a schematic diagram illustrating an opening of a whole country icon when the present invention is applied to a retail sales organization.

When the operational window 11 is closed by selecting the window close switch 9g by the mouse 1b (step 130), the points of the language record table file 6a, the arithmetic record table file 6b and the science record table file 6c of individuals are operated on respectively automatically (step 131) while displaying the in-calculation (FIG. 22), resulting in a table icon "3-subject total" 71 corresponding to the 3-subject total file 6e shown in FIG. 33 (FIG. 23) (step 132). Calculations of cell data of a plurality of tables can be executed by repeating similar processing to the steps 113 to 121 shown in FIG. 27.

Figure 23:
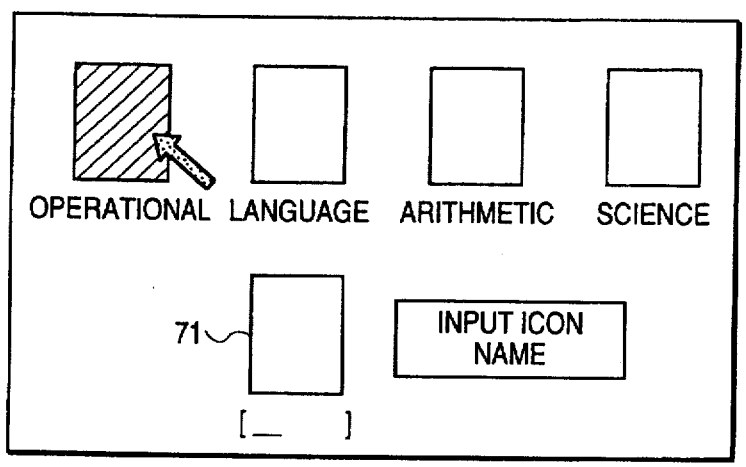
FIG. 23 is a schematic diagram illustrating a state where a totalized table icon is produced and an input of table name is being prompted.
Figure 24:
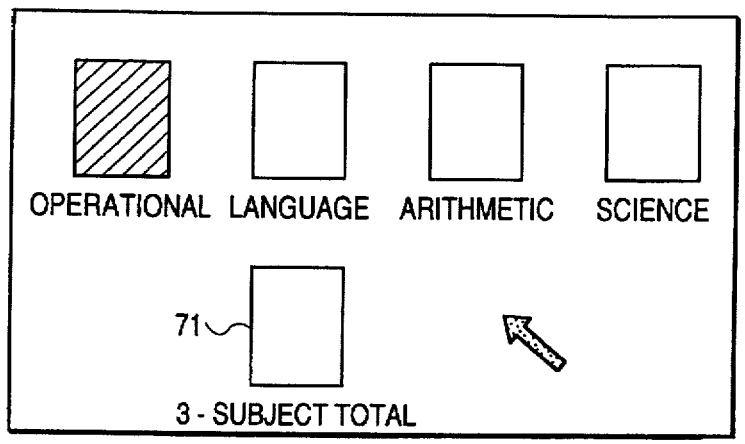
FIG. 24 is a schematic diagram illustrating a display screen when a table name "3 subject total" is input.

Then, "3-subject total" is input from the key board 1a according to a message "input icon name" shown in FIG. 23, resulting in the display shown in FIG. 24. The table icon "3-subject total" 71 corresponds to the 3-subject total file 6e shown in FIG. 33. Thus, the operation in the second embodiment (3-subject total processing) is completed (step 133).

Figure 35:
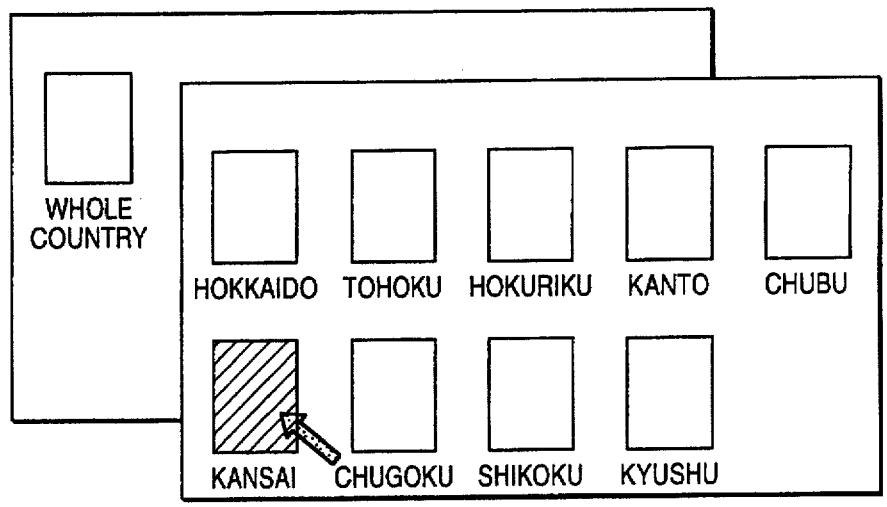
FIG. 35 is a schematic diagram illustrating a state where table icons of subsets of "whole country" are displayed as a result of FIG. 34 and, among them, a table icon "Pt" is opened.

Next, an example of the present invention applied to a retail store organization will be described. In the example, the table icon itself has a function of performing an operational function. A table icon "whole country" includes 9 local table icons, such as table icon "Kansai", as its subsets. When the table icon "whole country" shown in FIG. 34 is clicked by the mouse 1b, the respective table icons of its sunsets (in this embodiment, Hokkaido, Tohoku, Hokuriku, Kanto, Chubu, Kansai, Chugoku, Shikoku, Kyushu) are displayed as shown in FIG. 35. In this description, it is assumed that the formats of the spread sheets corresponding to all of the table icons are the same and only the "number of products sold" is to be totalized.

Figure 36:
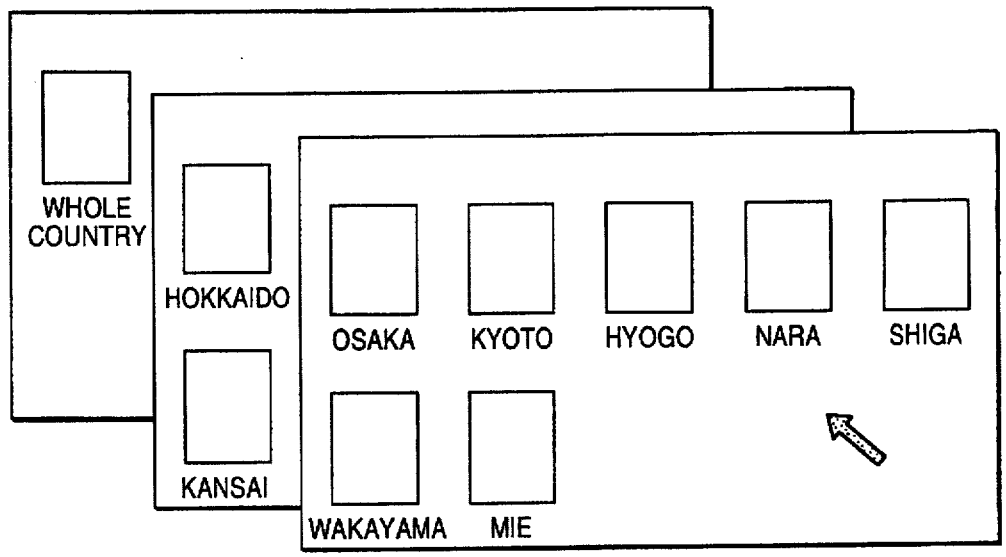
FIG. 36 is a schematic diagram illustrating a state where table icons of the subsets of "Pt" are displayed as a result of FIG. 35.

Similarly, the table icon "Kansai" includes 7 lower level table icons, such as table icon "Osaka", as its subsets. When the table icon "Kansai" shown in FIG. 35 is clicked by the mouse 1b, the respective table icons of its subsets (in this embodiment, Osaka, Kyoto, Hyogo, Nara, Shiga, Wakayama, Mie) are displayed as shown in FIG. 36. In this embodiment, it is assumed that the table icons have hierarchical relations in three levels as mentioned above.

FIG. 37 shows tables of the sales number and unit cost of respective products (raccoon, elephant, sea turtle, frilled lizard, orangutan) in the respective subsets (Osaka, Kyoto, Hyogo, . . . ) of Kansai. For example, when the sales number of raccoons in Osaka is increased by 20, the sales number in Kansai which is higher in level than Osaka is increased by 20 and that in the whole country which is higher in level than Kansai is increased by 20. A concrete calculation processing can be executed by setting a calculation condition such that totals of all of the lower level subsets as a value of a higher level and repeating processing similar to the steps 113 to 121 shown in FIG. 27.

Figure 38A:
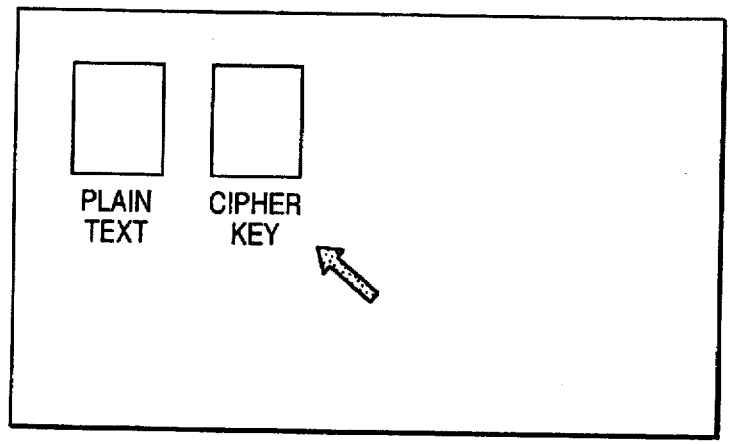
FIGS. 38A and 38B are a schematic diagrams illustrating a table storing window displaying a plain text and a cipher key both table-ionized.
Figure 38B:
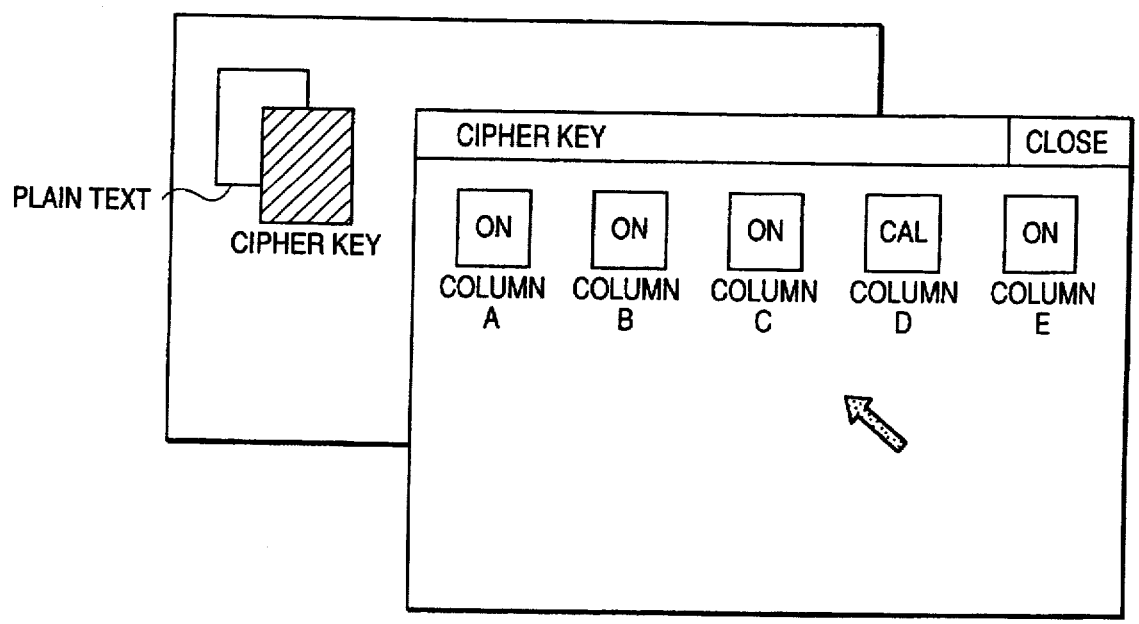

Next, an enciphering of the present invention will be described. FIGS. 38A and 38B show a table storing window displaying a plain text (data to be enciphered) and cipher key (for example, random number) which are table-iconized. A table icon, for example, a "plain text", which is to be enciphered is enciphered by moving a table icon "cipher key" to overlap the "plain text". Adding (or other reversible calculations) can also be performed on them. With this enciphering, it is possible to prevent important data from being intercepted or leaked during file transmission of the table corresponding to the table icon. A receiving personnel having the same table icon "cipher key" as that of a transmitting personnel can reproduce the table icon "plain text" by subtracting the "cipher key" from the enciphered table icon.

FIG. 39 shows an example of plain text (product sales management table), an example of cipher key and an example of cipher text produced by adding a D column (unit cost column) of the cipher key to the plain text. According to this embodiment, it is possible to encipher and decipher the plain text by only an operation of the table icon without opening the data file (spread sheet) such as shown in FIG. 39. Therefore, it is possible to encipher/decipher a large amount of data with minimum number of operations.

While the present invention has been described with respect to a method and apparatus for generating and performing operations on table type databases using icons it is not limited to such details since many changes and modifications recognizable to those of ordinary skill in the art may be made to the invention without departing from the spirit and the scope thereof.

We claim:

1. A method of performing operations between data of at least two tables, comprising the steps of:

displaying table icons each representing one of said at least two tables;

permitting a user to move one of said table icons to a position where the display of said one table icon overlaps the display of another of said at least two table icons;

automatically executing an operation selected by said user between data of tables corresponding to said one table icon and said another table icon when said one table icon is moved to a position overlapping said another table icon;

generating a new table including data resulting from said selected operation and a new table icon representing said new table; and displaying said new table icon representing said new table.

2. A method according to claim 1, wherein said selected operation is one of arithmetic, logical, function and user defined operations.

3. A method according to claim 1, wherein each of said tables includes a plurality of columns, a plurality of rows and a plurality of cells formed at intersections between said rows and said columns, said cells each contains data related to attributes of a column and a row which intersect each other forming said cell.

4. A method according to claim 3, wherein said selected operation is automatically executed between data contained in cells having the same position in said tables corresponding to said one and said another table icons.

5. A method according to claim 3, wherein said selected operation is automatically executed between data contained in cells having different positions in said tables corresponding to said one and said another table icons.

6. A method according to claim 3, wherein said operation is selected by displaying column icons representing columns of said at least two tables, displaying a pop-up menu when one of said columns is selected and permitting said user to select one of a plurality of menu items of said pop-up menu thereby indicating an operation to be performed on data in said one column.

7. A method of performing operations between data of a plurality of tables, comprising the steps of:
displaying table icons each representing one of said tables;
displaying an operational icon representing an operation selected by a user to be performed between data of at least two tables;
permitting a user to open an operational window by selecting said operational icon;
permitting said user to move table icons corresponding to said at least two tables to a position where the displays of said table icons corresponding to said at least two tables are within said operational window;
automatically executing said selected operation represented by said operational icon between data of said at least two tables when said table icons corresponding to said at least two tables are moved to a position within said operational window;
generating a new table including data resulting from said selected operation and a new table icon representing said new table; and
displaying said new table icon representing said new table.

8. A method according to claim 7, wherein said selected operation is one of arithmetic, logical, function and user defined operations.

9. A method according to claim 7, wherein each of said tables includes a plurality of columns, a plurality of rows and a plurality of cells formed at intersections between said rows and said columns, said cells each contains data related to attributes of a column and a row which intersect each other forming said cell.

10. A method according to claim 9, wherein said selected operation is automatically executed between data contained in cells having the same position in said tables corresponding to said one and said another table icons.

11. A method according to claim 9, wherein said selected operation is automatically executed between data contained in cells having different positions in said tables corresponding to said one and said another table icons.

12. A method according to claim 9, wherein said operation is selected by displaying column icons representing columns of said at least two tables, displaying a pop-up menu when one of said columns is selected and permitting said user to select one of a plurality of menu items of said pop-up menu thereby indicating an operation to be performed on data in said one column.

13. An information processing apparatus for permitting a user to perform operations between data of at least two tables, said data of said at least two tables being stored in memory connected to said information processing apparatus, said information processing apparatus comprising:
a display for displaying information;
a terminal for permitting a user to input commands and information;
an information processing unit for displaying on said display table icons each representing one of said at least two tables, permitting a user to move one of said table icons on said display to a position where the display of said one table icon overlaps the display of another of said at least two table icons and selected in operation to be executed between data of tables corresponding to said one table icon and said another table icon, automatically executing said selected operation when said one table icon is moved to a position overlapping said another table icon, generating a new table including data resulting from said selected operation and a new table icon representing said new table, and displaying on said display said new table icon representing said new table.

14. An information processing apparatus according to claim 13, wherein said selected operation is one of arithmetic, logical, function and user defined operations.

15. An information processing apparatus according to claim 13, wherein each of said tables includes a plurality of columns, a plurality of rows and a plurality of cells formed at intersections between said rows and said columns, said cells each contains data related to attributes of a column and a row which intersect each other forming said cell.

16. An information processing apparatus according to claim 15, wherein said selected operation is automatically executed by said information processing unit between data contained in cells having the same position in said tables corresponding to said one and said another table icons.

17. An information processing apparatus according to claim 15, wherein said selected operation is automatically executed by said information processing unit between data contained in cells having different positions in said tables corresponding to said one and said another table icons.

18. An information processing apparatus according to claim 15, wherein by said information processing unit said operation to be selected by displaying column icons representing columns of said at least two tables, displaying a pop-up menu when one of said columns is selected and permitting said user to select one of a plurality of menu items of said pop-up menu thereby indicating an operation to be performed on data in said one column.

19. An information processing apparatus for permitting a user to perform operations between data of a plurality of tables, said data of said at least two tables being stored in memory connected to said information processing apparatus, said information processing apparatus comprising:
a display for displaying information;
a terminal for permitting a user to input commands and information;

an information processing unit for displaying on said display table icons each representing one of said tables, displaying on said display an operational icon representing an operation selected by a user to be performed between data of at least two tables, permitting a user to open an operational window by selecting said operational icon, permitting said user to move table icons on said display corresponding to said at least two tables to a position where the displays of said table icons corresponding to said at least two tables are within said operational window, automatically executing said selected operation represented by said operational icon between data of said at least two tables when said table icons corresponding to said at least two tables are moved to a position within said operational window, generating a new table including data resulting from said selected operation and a new table icon representing said new table, and displaying on said display said new table icon representing said new table.

20. An information processing apparatus according to claim 19, wherein said selected operation is one of arithmetic, logical, function and user defined operations.

21. An information processing apparatus according to claim 19, wherein each of said tables includes a plurality of columns, a plurality of rows and a plurality of cells formed at intersections between said rows and said columns, said cells each contains data related to attributes of a column and a row which intersect each other forming said cell.

22. An information processing apparatus according to claim 21, wherein said selected operation is automatically executed by said information processing unit between data contained in cells having the same position in said tables corresponding to said one and said another table icons.

23. An information processing apparatus according to claim 21, wherein said selected operation is automatically executed by said information processing unit between data contained in cells having different positions in said tables corresponding to said one and said another table icons.

24. An information processing apparatus according to claim 21, wherein by said information processing unit permits said operation to be selected by displaying column icons representing columns of said at least two tables, displaying a pop-up menu when one of said columns is selected and permitting said user to select one of a plurality of menu items of said pop-up menu thereby indicating an operation to be performed on data in said one column.

* * * * *